United States Patent
Fontaine

[15] 3,704,352
[45] Nov. 28, 1972

[54] COMPOSITE SEAT AND SWITCH
[72] Inventor: John G. Fontaine, 2817 N.E. 26th Court, Fort Lauderdale, Fla. 33306
[22] Filed: Nov. 17, 1971
[21] Appl. No.: 199,518

[52] U.S. Cl. ............... 200/85 R, 340/278, 200/86 R
[51] Int. Cl. ............................................. H01h 3/14
[58] Field of Search ............ 340/278; 200/85 R, 86 R

[56] References Cited

UNITED STATES PATENTS 2,794,089   5/1957   Hogg et al. ............... 200/85 R

FOREIGN PATENTS OR APPLICATIONS 392,936   5/1933   Great Britain ........... 200/86 R Primary Examiner—David Smith, Jr.
Attorney—John H. Oltman et al.

[57] ABSTRACT

A composite seat and switch incorporating elements of a seat of an automotive vehicle and including sheets having electrical contacts which make and break through openings in a resilient, compressible, insulating separator, the sheets and separator cooperating with a seat padding layer, springs and a seat cover.

10 Claims, 9 Drawing Figures

PATENTED NOV 28 1972

INVENTOR.
JOHN G. FONTAINE

INVENTOR.
JOHN G. FONTAINE

COMPOSITE SEAT AND SWITCH

BACKGROUND OF THE INVENTION

This invention relates to an improved seat switch of the general type described and claimed in U.S. Pat. No. 3,487,451.

In accordance with said patent, a switch was provided in a seat for controlling the brakes of an automotive vehicle. It has been found that a switch of this type can be utilized to control other functions in an automobile such as seat belts, headlights, windshield wipers, etc. It would be desirable, however, to make the seat padding, seat cover and spring integral parts of the switch.

SUMMARY OF THE INVENTION

The present invention provides a seat switch which incorporates and includes structural components of the seat of an automotive vehicle. The seat switch includes sheets having contacts which make and break through openings in a resilient, insulating, compressible separator between the sheets, the sheets and separator lying against a resilient, flexible, insulating pad inside the seat of an automotive vehicle. The sheets and separator may be above or below the pad, or between two pads inside the seat. The assemblage is supported by seat springs and covered by a seat cover to integrate all parts into a composite seat and switch.

It is an object of the present invention to build a seat switch directly into the seat of an automotive vehicle whereby the padding and seat cover of the seat are integrally associated with and enclose the contact elements of the seat switch.

Another object of the invention is to eliminate padding and envelope structure from a seat switch by integrating the seat switch directly with padding and seat cover components of the seat of an automotive vehicle.

A further object of the invention is to reduce the number of functions and parts required for building a switch into a seat of an automotive vehicle.

Still another object of the invention is to make parts of the seat switch accessible for repair.

Other objects of this invention will appear from the following description and appended claims, reference being had to the accompanying drawings forming a part of this specification wherein like reference characters designate corresponding parts in the several views.

ON THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
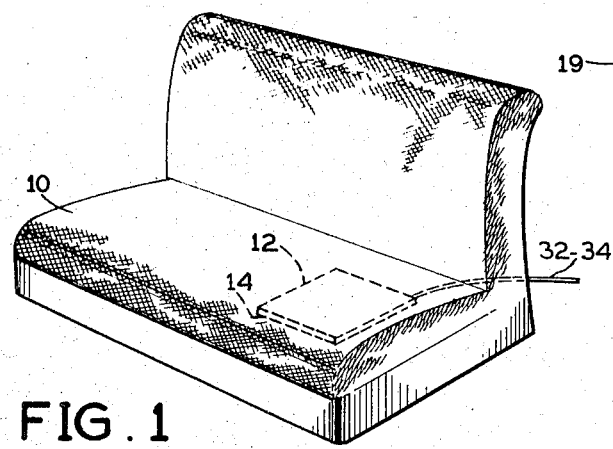
FIG. 1 is a schematic perspective view of a seat in an automotive vehicle having a seat switch therein in accordance with the invention.
Figure 2:
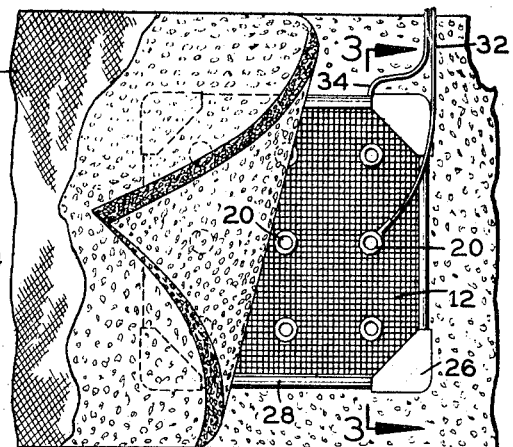
FIG. 2 is a schematic view showing two layers of padding of the seat of FIG. 1 with the top layer roller back to reveal the contact sheets and separator of the seat switch.

FIG. 1 is a schematic view intended to illustrate that the seat switch of the invention is incorporated directly into and includes parts of the horizontal seat cushion 10 of an automotive vehicle, the switch including contact layers 12 and 14 sandwiched between pads 16 and 18 of the seat. In FIG. 2, the pads 16 and 18 are shown with the top pad 16 being pulled back to show the contact sheets between them.

Figure 3:
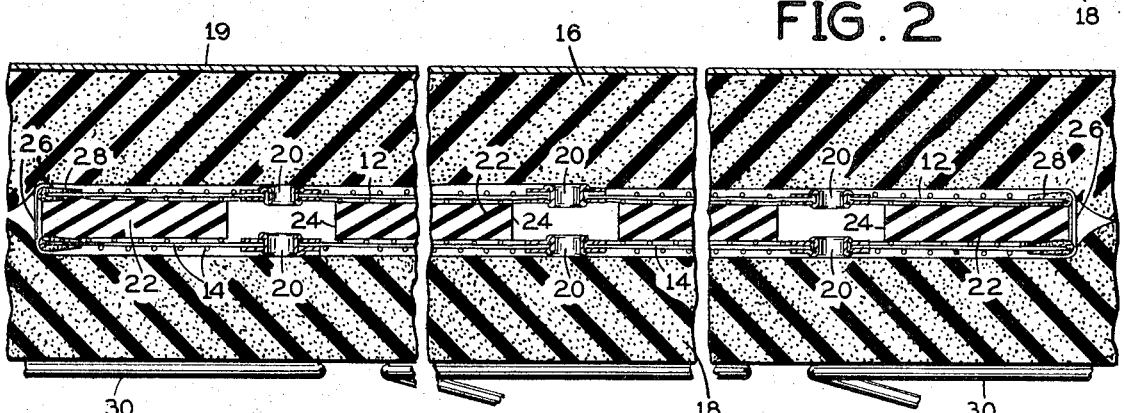
FIG. 3 is a fragmentary sectional view taken along line 3—3 of FIG. 2 showing the contact sheets and separator sandwiched between padding layers of the seat and covered by the seat cover of the seat.

FIG. 3 shows the manner in which the switch is integrated directly into a seat providing a composite seat and switch. The contact sheets 12 and 14 are flexible sheets carrying conductive electrical contacts 20 in the form of eyelets or buttons. The contacts 20 may be provided only on the top sheet 12, or only on the bottom sheet 14, or on both sheets as illustrated by way of example. The contact sheets 12 and 14 may be made of any suitable flexible material, and are preferably made of flexible wire mesh which is conductive such that the electrical contacts on a given sheet are electrically common with each other.

Between the contact sheets 12 and 14, there is a resilient, compressible, insulating separator 22 which is also a sheet of the same area as the contact sheets. The separator 22 may be made of a material such as foam rubber, although other materials are possible. The separator 22 has apertures 24 aligned with the contacts 20 so that the contacts can close through the apertures. However, the separator is sufficiently thick that it normally spreads the contacts apart, thus keeping the switch normally open.

The contact sheets 12 and 14 and the separator 22 may be somewhat flexibly held together by means of retainers 26 in the form of strips of tape or the like at the edge or corners thereof. The retainers 26 keep the contact sheets 12 and 14 from becoming misaligned. The contact sheets may also have a bead 28 of binding material such as resin about the perimeter thereof, particularly where the contact sheets are wire mesh.

The pads 16 and 18 are the main padding of the seat 10, and no separate padding is required. The upper pad 16 is covered by an ordinary seat cover 19 which may be fabric, plastic, or other suitable material. The pads 16 and 18 are preferably a foam rubber material. They preferably extend over the full area of the horizontal seat cushion 10, and so are larger and thicker than the contact sheets. Pad 18 lies on the springs 30 of the seat, the springs normally being of the zig zag type.

The switch is normally open and is kept open by the separator 22. When a person sits on the seat cushion 10 over the contact sheets 12 and 14, pads 16 and 18 squeeze together, and the separator 22 is compressed, thus reducing its thickness. The contacts 20 close through the apertures 24, thus closing the switch. A circuit path through the switch is provided by leads 32 and 34 which may be attached to a pair of upper and lower contacts.

An advantage of the switch is that the contacts 20 are spread over a substantial area of the seat, so that even if the person sitting on the seat leans over or shifts his position, the contacts will remain closed. It is believed that the contact sheets need only cover the area occupied by one seated person, but more than one pair of contact sheets may be put in a given seat cushion.

When the person gets off the seat, the contacts 20 open, and this opening of contacts may be utilized as a signal to control a specified function of the vehicle. For example, when the seat switch opens, the brakes of the vehicle may be applied automatically. Alternatively, the switch may be arranged so that seat belts or some other function will not operate unless the contacts 20 are closed. Other functions may be controlled by opening or closing of the contacts.

Figure 5:
FIG. 5 is a fragmentary sectional view showing a modification wherein the upper pad of the seat is recessed to receive the contact sheets and separator.

FIG. 3 illustrates a modification wherein the same reference numerals are used for like parts, except that a prime designation has been added to each reference numeral in order to identify the modified embodiment. The construction of the contact layers 12' and 14', the separator 22', the pad 18', the retainers 26' and the seat cover 19' is identical to the construction of the corresponding elements as described above in connection with FIGS. 1 through 4. In FIG. 5, the only difference is that the upper pad 16' is recessed upwardly from the bottom side to receive the contact sheets 12', 14' and the separator 22' in the recess.

Figure 6:
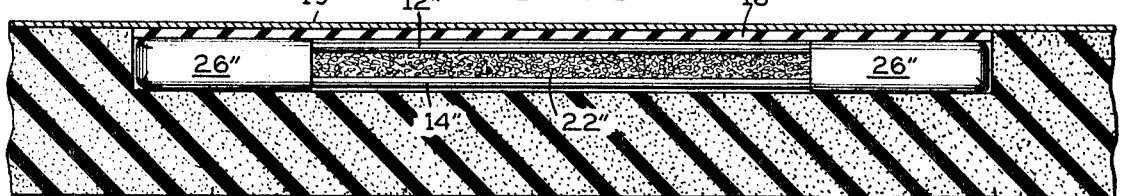
FIG. 6 is another fragmentary section view showing a different modification wherein a main pad of the seat is recessed down from the top to receive the contact sheets and separator, and a smaller pad covers the recess.
Figure 4:
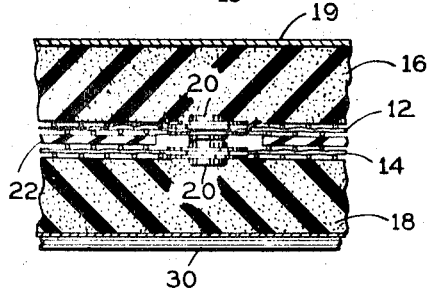
FIG. 4 is a smaller fragmentary view showing contacts of the switch in a closed position.

FIG. 6 illustrates another modification of the invention in which the same reference numerals have been used for like parts except that a double prime designation has been added to each reference numeral in order to identify this modified embodiment. The contact sheets 12'' and 14'', the separator 22'', the retainers 26'' and the seat cover 19'' are identical in construction to the corresponding elements of FIGS. 1 through 4. The only difference in FIG. 6 is that the pad 18'' becomes the main pad of the seat cushion lying directly under the seat cover 19'' and is recessed downwardly from the top side to receive the contact sheets 12'', 14'' and the separator 22''. The recess also receives a smaller upper pad 16'' which is the same size as the contact sheets and covers the upper contact sheet within the recess. The materials of construction of each of the elements may be the same as described in connection with FIGS. 1 through 4.

Figure 7:
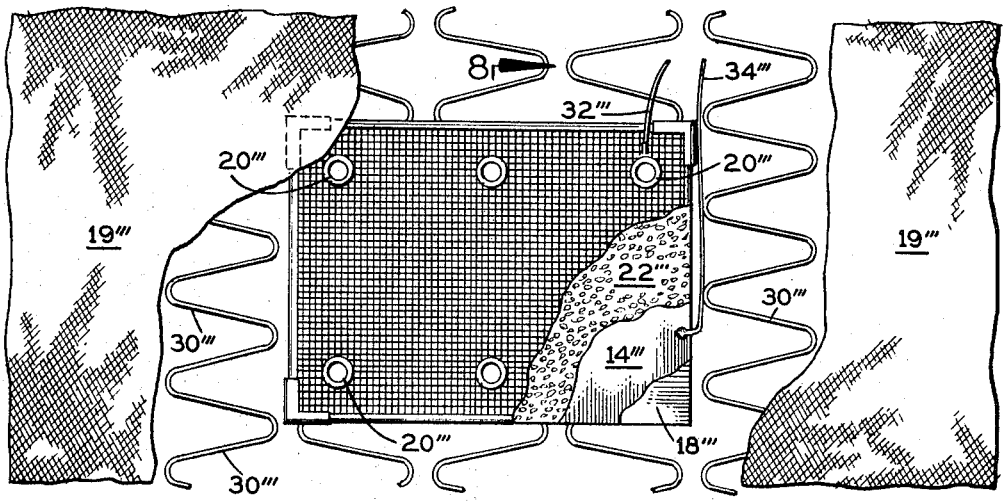
FIG. 7 is a plan view, partly cut away, showing a portion of a seat wherein the contact sheets and separator lie under a pad of the seat and are accessible through the springs of the seat.
Figure 8:
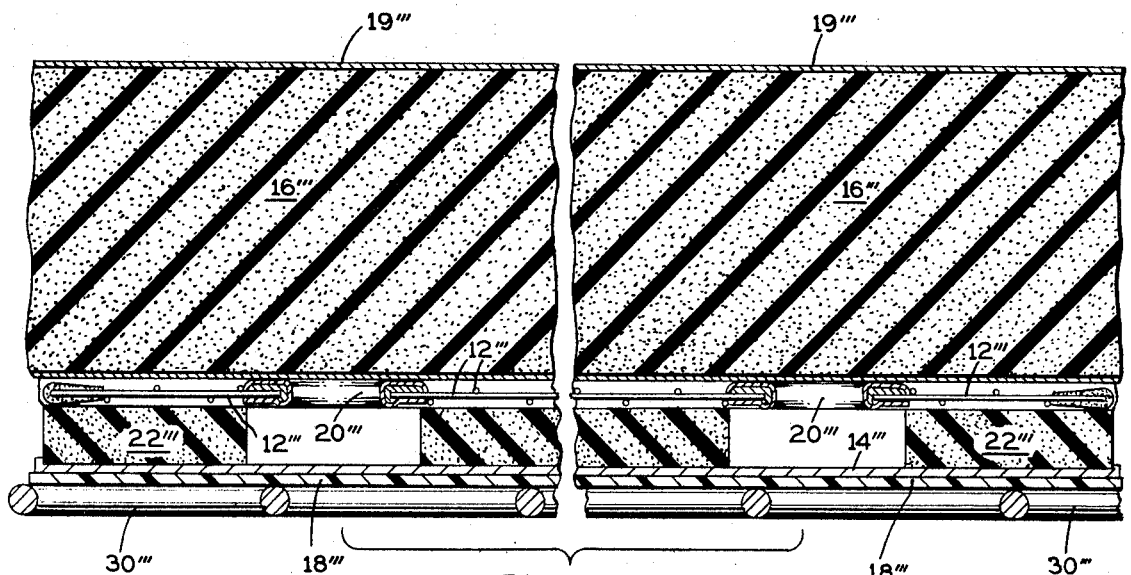
FIG. 8 is a fragmentary sectional view taken along line 8—8 of FIG. 7.
Figure 9:
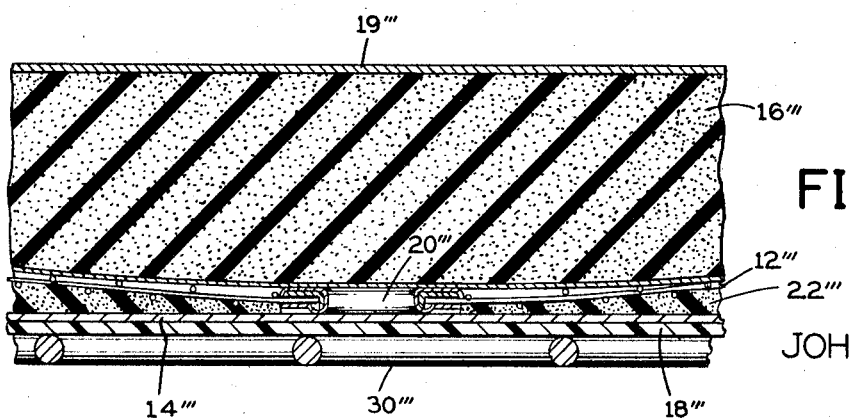
FIG. 9 is a smaller fragmentary view showing a portion of the switch of FIG. 8 in a closed position.

FIGS. 7, 8 and 9 illustrate another embodiment of the invention. In this embodiment, the same reference numerals have been used for like parts in FIGS. 1 through 4, except that a triple prime designation has been added to each reference numeral in order to identify the embodiment of FIGS. 7 through 9. In the embodiment of FIGS. 7 through 9, there are several differences. The contact sheets 12''' and 14''' and the separator 22''' are positioned under a main pad 16''' directly above the springs 30'''. The lower pad 18''' is made thinner and corresponding in area to the contact sheets rather than extending over the entire area of the seat cushion. The lower contact sheet 14''' is made more rigid, and is preferably a continuous metal sheet. The discrete contacts 20''' are carried only on the upper contact sheet 12'''. When a person sits on the seat, the contacts 29''' close against the metal sheet 14''' thus closing the switch. The leads 32'''' and 34'''' are still connected to the respective contact sheets. With this construction, it is possible to remove the sheets 12'''', 14'''', 22'''' and 18'''' through the springs 30'''' of the seat for repair purposes.

Thus, the invention provides a simple seat switch which includes the seat cushion of a vehicle requiring no envelope or padding other than the padding and seat cover of the seat.

Having thus described my invention, I claim:

1. A composite seat and switch comprising:

A pair of mutually facing horizontal contracting sheets at least one of which carries a plurality of electrical contacts distributed over an area thereof normally occupied by a seated person, a resilient, compressible, insulating separator between said sheets and normally keeping said sheets apart, said separator having apertures aligned with said electrical contacts through which said contacts may close in response to a person sitting on said sheets, a horizontal insulating pad contacting one side of one of said sheets and extending beyond said sheets to occupy a greater area than said sheets, means insulating the other of said sheets, seat springs supporting said pad, sheets, separator and insulating means, and a seat cover covering said pad, sheets, separator, insulating means and said springs, thereby integrating the last mentioned elements into a functional composite seat and switch.

2. The composite seat and switch of claim 1 in which said insulating means comprises a second pad.

3. The composite seat and switch of claim 1 in which at least one of said contacting sheets is made of flexible material.

4. The composite seat and switch of claim 1 in which said pad has a recess therein receiving said contacting sheets and said separator.

5. The composite seat and switch of claim 1 in which said pad and said separator and said insulating means constitute the sole padding of said seat.

6. The composite seat and switch of claim 5 in which said seat cover constitutes the sole enveloping structure of said switch.

7. In an automotive vehicle, a composite seat and switch comprising, seat springs supported above a floor of the vehicle, a generally horizontal insulating seat pad affixed on and covering said springs, first and second contacting sheets at least one of which carries a plurality of electrical contacts distributed over an area of said seat to be occupied by a person,
one of said contacting sheets having one side thereof in face to face contact with said pad, and the other of said contacting sheets being parallel to said one sheet,
a resilient, compressible, insulating separator between said sheets, said separator having apertures aligned with said electrical contacts through which said contacts may close,
insulating means covering said other contacting sheet,
seat cover means covering said pad and said springs,
said pad and said separator together with said insulating means constituting the sole padding of said seat, and
said seat cover means constituting the only enveloping structure for said switch.

8. In an automotive vehicle, a composite seat and switch comprising,
seat springs supported above a floor of the vehicle,
a generally horizontal insulating pad affixed on and covering said springs,
first and second contacting sheets at least one of which carries a plurality of electrical contacts distributed over an area of said seat to be occupied by a person, one of said sheets lying horizontally against said pad and the other sheet being parallel thereto,
a resilient, compressible, insulating separator between said sheets, said separator having apertures aligned with said electrical contacts through which said contacts may close, but said separator normally separating said contacts,
insulating means covering said other contacting sheets, and
seat cover means covering said pad and said springs.

9. The seat and switch as claimed in claim 8 including means retaining the edges of said sheets to keep said contacts aligned.

10. The seat and switch as claimed in claim 9 including means binding the edges of each of said sheets.

* * * * *

UNITED STATES PATENT OFFICE
CERTIFICATE OF CORRECTION

Patent No. 3,704,352    Dated November 28, 1972

Inventor(s) John G. Fontaine

It is certified that error appears in the above-identified patent and that said Letters Patent are hereby corrected as shown below:

Column 3, line 32, "FIG. 3" should read -- FIG. 5 --.

Column 4, line 25, "contracting" should read -- contacting --.

Column 6, line 14, "sheets" should read -- sheet --.

Signed and sealed this 30th day of April 1974.

(SEAL)
Attest:

EDWARD M. FLETCHER, JR.
Attesting Officer

C. MARSHALL DANN
Commissioner of Patents